United States Patent
Parker

(10) Patent No.: US 6,170,893 B1
(45) Date of Patent: Jan. 9, 2001

(54) IMPLEMENT WITH REINFORCING RIB OR CORRUGATION

(75) Inventor: Thomas W. Parker, Columbus, OH (US)

(73) Assignee: UnionTools, Inc., Columbus, OH (US)

( * ) Notice: Under 35 U.S.C. 154(b), the term of this patent shall be extended for 0 days.

(21) Appl. No.: 09/371,521

(22) Filed: Aug. 10, 1999

Related U.S. Application Data

(60) Provisional application No. 60/096,862, filed on Aug. 14, 1998.

(51) Int. Cl.$^7$ ........................................................ A01B 1/02
(52) U.S. Cl. .................................................................. 294/49
(58) Field of Search .............................. 294/49, 51, 54.5, 294/55, 55.5, 57, 59; 76/111, 113; 111/106; 172/371, 378, 381; 254/131.5, 132

(56) References Cited

U.S. PATENT DOCUMENTS

| | | | |
|---|---|---|---|
| 121,331 * | 11/1871 | Calhoun | 294/49 |
| 1,083,952 * | 1/1914 | Surbaugh | 294/49 |
| 1,194,924 * | 8/1916 | Anderson | 294/49 |
| 1,225,864 * | 5/1917 | Schlager | 294/49 |
| 1,353,307 * | 9/1920 | Berger | 294/49 X |
| 1,458,987 * | 6/1923 | Della Monica | 294/55.5 |
| 1,706,658 * | 3/1929 | Davis | 294/49 X |
| 2,937,046 * | 5/1960 | Olvey | 294/49 |
| 3,177,026 | 4/1965 | Cowan | 294/54.5 |
| 4,655,494 * | 4/1987 | Eads et al. | 294/49 |

FOREIGN PATENT DOCUMENTS

| | | | |
|---|---|---|---|
| 830902 * | 8/1938 | (FR) | 294/49 |
| 1007708 | 5/1952 | (FR) . | |
| 1009947 | 11/1965 | (GB) . | |
| 2063142 | 6/1981 | (GB) . | |
| 359640 * | 6/1938 | (IT) | 294/49 |

* cited by examiner

Primary Examiner—Johnny D. Cherry
(74) Attorney, Agent, or Firm—Finnegan, Henderson, Farabow, Garrett & Dunner, L.L.P.

(57) ABSTRACT

A reinforced implement such as a shovel is described having increased strength and resistance to deformation and/or fracture, especially in the area where the socket engaging the handle and blade are joined. Advantageously, the blade, socket, and reinforcement are formed from a single unitary piece of material having essentially uniform thickness.

4 Claims, 3 Drawing Sheets

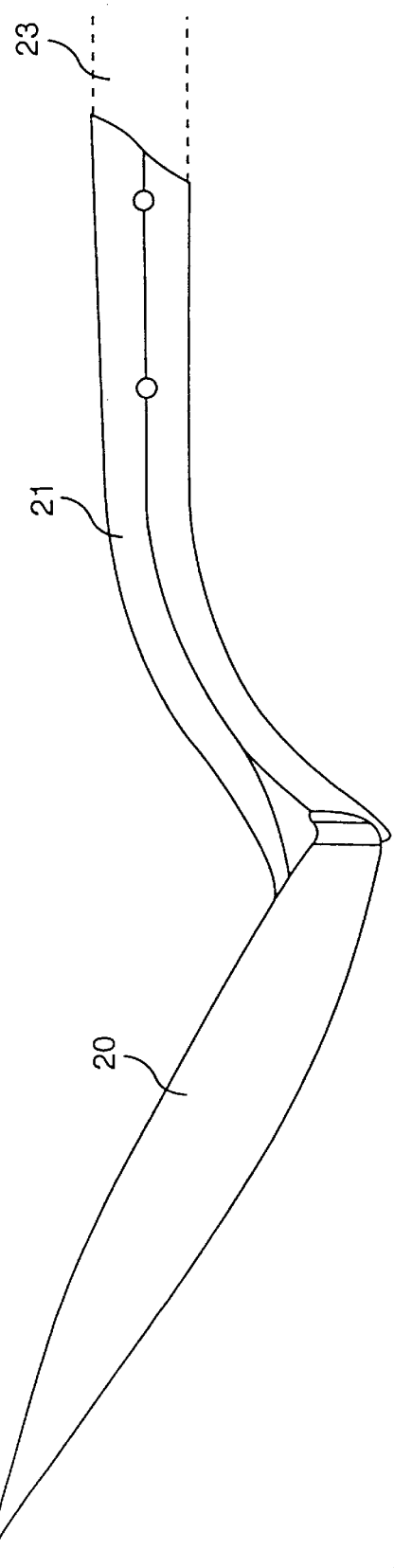
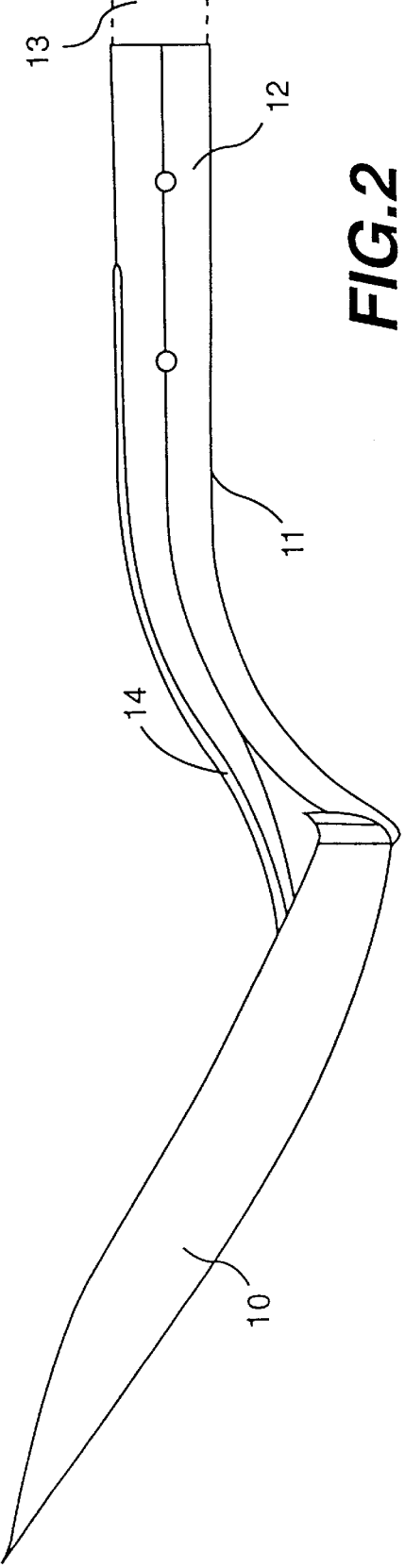

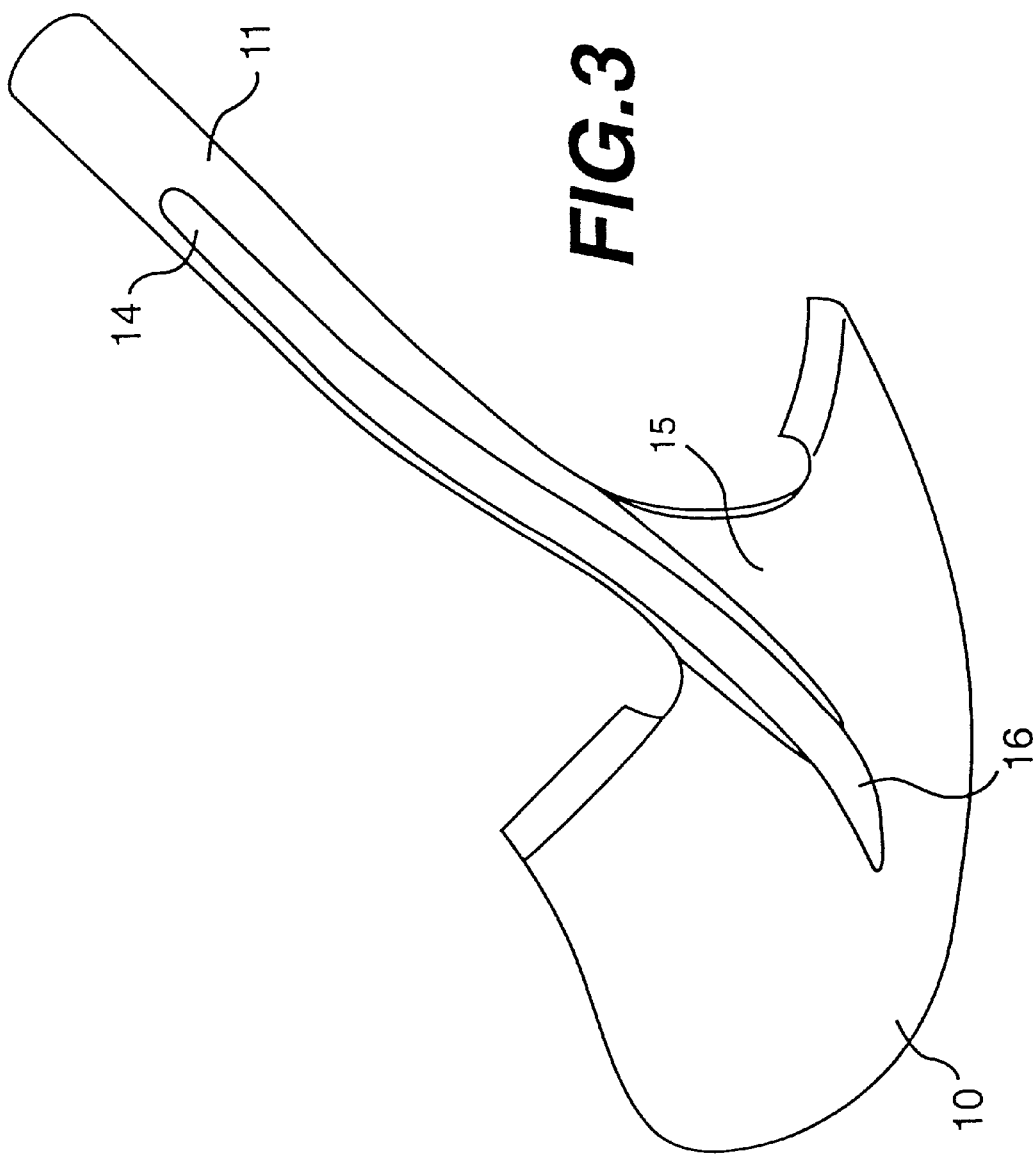

IMPLEMENT WITH REINFORCING RIB OR CORRUGATION

This application claims the benefit under 35 U.S.C. § 119(e) of U.S. Provisional Application No. 60/096,862 filed Aug. 14, 1998.

BACKGROUND OF THE INVENTION

1. Field of the Invention

The present invention is directed to an implement such as a shovel or spade having a reinforced structure that results in improved strength.

2. Description of the Related Art

Implements, such as shovels or spades, generally include a work engaging blade, an elongated handle for manipulating the blade and a socket which joins the handle to the blade. Because these implements are typically used for transferring relatively heavy material, such as dirt or similar material, by taking advantage of the leverage provided by the elongated handle, considerable stress is applied to the area where the handle and socket interface with the work engaging blade. While formerly, conventional wooden handles have had a greater tendency to break than the blade, with the advent of stronger fiber glass and composite handles, a greater likelihood is presented of the blade itself being subjected to sufficient stress to either deform or break. Such a deformation or breakage can also in part result from metal fatigue caused by repeated stress over a long period of time.

Accordingly, as with many implements which employ leverage to repetitively move or work against relatively heavy objects, there is a need for providing greater strength, especially in the areas of the implement most directly affected by stress and most likely to undergo fracturing or deformation.

Previous attempts to provide such enhanced strengthening, particularly to shovels and spades, have involved, for example, providing thickened or reinforced metal portions where the stress is most likely to occur. This, however, results in greater weight and expense since the thickness of the blade must necessarily be varied to provide the enhanced strengthening. It would therefore be desirable to provide enhanced strengthening of the blade and socket of an implement, especially without having to employ additional material or material of variable thickness or type in order to achieve the desired strengthening of the device.

SUMMARY OF THE INVENTION

Accordingly, the present invention is directed to an implement such as a shovel or spade that substantially obviates one or more of the problems of devices of the prior art.

Additional features and advantages of the invention will be set forth in the description which follows and in part will be apparent from the description or may be learned by the practice of the invention. The objectives and other advantages of the invention will be realized and attained by the device of the invention as particularly pointed out in the written description and claims hereof as well as the appended drawings.

To achieve these and other advantages and in accordance with the purpose of the invention, as embodied and broadly described, the invention comprises a device such as a shovel or spade having an elongated handle, a work engaging blade and a socket for receiving an end portion of the handle. The socket has a tubular portion for receiving the end of the handle and a flared portion that extends into the blade and joins the socket with the blade. An elongated reinforcing rib extends longitudinally along the tubular portion of the socket and the flared portion into about the middle portion of the blade to provide enhanced strength to the structure especially at the point where the socket and the blade of the implement are joined together.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of the specification. The drawings illustrate embodiments of the invention and together with the description serve to explain the principles of the invention.

FIG. 1 is a side view of a conventional shovel of the prior art.

FIG. 2 is a side view of the shovel of the present invention with a reinforcing rib.

FIG. 3 is a perspective view of the reinforced shovel of the present invention.

DETAILED DESCRIPTION OF THE INVENTION

Figure 4:
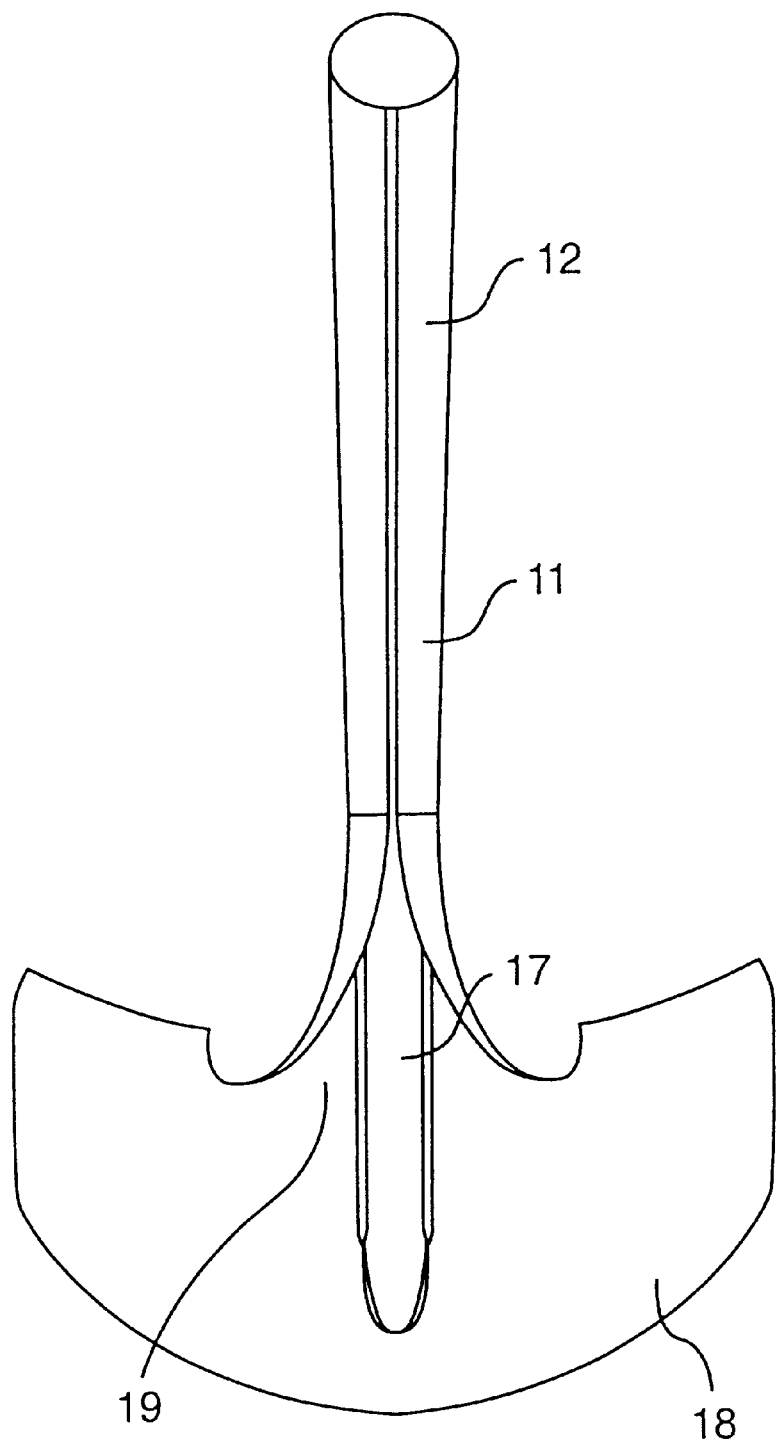
FIG. 4 is a view of the back of a reinforced shovel in accordance with the present invention.

Reference will now be made in detail to the present preferred embodiments of the invention, examples of which are illustrated in the accompanying drawings.

In FIG. 1 of the drawings, a conventional shovel of the prior art is illustrated having a work engaging blade 20 to which is attached a tubular socket 21 for accommodating an elongated handle 23.

FIGS. 2, 3, and 4 of the drawings illustrate an exemplary embodiment of the implement of the invention.

As shown in the drawings, a tubular socket 11 is integrally attached to blade 10 by a flared portion 15 which extends radially outward from the axis of the tubular socket along the surface of blade 10. Tubular socket 11 has a relatively linear portion 12 for accommodating an elongated handle 13 that permits leveraged manipulation of the blade 10. A reinforcing rib 14 extends along a portion of the top of the socket 11 and engages, along with the socket 11, the concave inner surface of the blade 10. Socket 11 flares from its tubular configuration to join with the blade 10. As particularly illustrated in FIG. 3 of the drawings, the reinforcing rib 14 may actually extend at 16 beyond the flared portion 15 that extends from the socket and joins the socket with the blade. FIG. 4 of the drawings further illustrates the invention by showing the underside 17 of rib 14 engaging with the convex underside or outer surface 19 of the flared portion 15 and blade 18.

As illustrated, the reinforcing rib 14 is shown as a raised elongated structure projecting above the socket 11 and extending a substantial portion of the length of the socket 11 to the surface of the work engaging blade 18. It will be understood, however, that the reinforcing rib could also be of concave or recessed configuration forming a lengthwise corrugation in the socket portion of the device. In this case, the handle 13 may conveniently be provided with a longitudinal slot to accommodate the inwardly projecting longitudinal rib or corrugation.

It will further be appreciated that the entire implement of the present invention, excluding the handle portion, is advantageously formed from a single sheet of material which is pressed or stamped into the required form. By providing a reinforcing rib extending along the upper surface of the socket structure into the surface of the blade considerable additional strength is provided to the structure and stress at this point and is distributed forward from the area of the juncture of the socket and the blade, sometimes referred to as the "frog." It will also be appreciated that, while the reinforcing rib in accordance with the present invention is illustrated as extending over a portion of the socket into the blade area, the extent of the reinforcing rib can, in accordance with the invention, be varied to extend the full length of the socket and beyond its point of juncture with the blade or where the flared portion of the socket is joined to the blade.

It will also be apparent that the present invention is applicable to any appropriate implements wherein a work engaging member such as a blade is manipulated by leveraging with a joined, elongated handle. For example, an implement constructed in accordance with the present invention could be configured as a shovel, a spade, or a pitch fork.

It will be apparent to those skilled in the art that various modifications and variations can be made in the device of the present invention without departing from the spirit or scope of the invention. Thus, it is intended that the present invention cover the modifications and variations of this invention provided they come within the scope of the appended claims and their equivalents.

What is claimed is:

1. In a shovel blade for attachment to an elongated handle and comprising an integral member pressed or stamped from a single sheet of material having a substantially uniform thickness, the member including a blade portion having inner and outer surfaces, a generally tubular socket portion, and a flared portion joining the socket portion and the blade portion, the socket portion having a generally straight section extending to one end of the socket portion for receiving the elongated handle, and a curved section extending through the flared portion to an opposite end of the socket portion, the socket portion further having a convex top side that merges at the opposite end thereof with the inner surface of the blade portion, the improvement comprising:

a corrugation rib in the convex top side of the socket portion and extending at least between the opposite end of the socket portion and a point on the straight section of the socket portion.

2. The shovel blade of claim 1, wherein the corrugation rib projects with a convex cross-section from the top side of the socket portion.

3. The shovel blade of claim 1, wherein the corrugation rib extends through the opposite end of the socket portion and merges with the inner surface of the blade portion.

4. The shovel blade of claim 1, wherein the blade portion is spade-shaped.

\* \* \* \* \*